(12) United States Patent
Kim et al.

(10) Patent No.: US 8,156,344 B2
(45) Date of Patent: Apr. 10, 2012

(54) METHOD AND APPARATUS FOR BACKING UP AND RESTORING DOMAIN INFORMATION

(75) Inventors: Bong-seon Kim, Seongnam-si (KR); Myung-sun Kim, Uiwang-si (KR); Sung-hyu Han, Seoul (KR); Young-sun Yoon, Suwon-si (KR); Sun-nam Lee, Suwon-si (KR); Jae-heung Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1141 days.

(21) Appl. No.: 11/374,077

(22) Filed: Mar. 14, 2006

(65) Prior Publication Data

US 2006/0206920 A1  Sep. 14, 2006

Related U.S. Application Data

(60) Provisional application No. 60/661,037, filed on Mar. 14, 2005.

(30) Foreign Application Priority Data

May 24, 2005   (KR) .......................... 10-2005-0043759

(51) Int. Cl.
  *H04L 29/06* (2006.01)
(52) U.S. Cl. ....................................................... 713/189
(58) Field of Classification Search ................... 713/189
  See application file for complete search history.

(56) References Cited

U.S. PATENT DOCUMENTS

| 7,325,156 B1* | 1/2008 | Schloss et al. ................. 714/6.3 |
| 2001/0019614 A1* | 9/2001 | Madoukh ....................... 380/277 |
| 2003/0099355 A1* | 5/2003 | Moroney ........................ 380/210 |
| 2004/0208117 A1 | 10/2004 | Kim |
| 2004/0240451 A1 | 12/2004 | Lee et al. |
| 2004/0255038 A1 | 12/2004 | Kuroda et al. |
| 2005/0193199 A1* | 9/2005 | Asokan et al. ................. 713/168 |
| 2006/0005048 A1* | 1/2006 | Osaki et al. ................... 713/193 |
| 2007/0061385 A1* | 3/2007 | Clark et al. .................... 707/204 |

FOREIGN PATENT DOCUMENTS

| CN | 1573706 A | 2/2005 |
| KR | 2002-0028470 A | 4/2002 |
| KR | 10-2003-0007374 A | 1/2003 |
| KR | 2003-0050551 A | 6/2003 |
| KR | 10-2003-0083405 A | 10/2003 |
| KR | 10-2004-0019746 A | 3/2004 |
| KR | 10-2004-0049667 A | 6/2004 |
| KR | 10-2004-0056743 A | 7/2004 |
| WO | 03/005247 A2 | 1/2003 |

* cited by examiner

*Primary Examiner* — Jason Gee
(74) *Attorney, Agent, or Firm* — Sughrue Mion, PLLC

(57) ABSTRACT

A method of backing up domain information relating to the construction of a domain is provided. In the method, the domain information is encrypted and the encrypted domain information is stored in a predetermined storage device in the domain the encrypted domain information to the predetermined storage device, thereby securely backing up the domain information without the help of an external network. Accordingly, even when the existing domain server malfunctions, a new domain server is capable of obtaining the domain information.

25 Claims, 8 Drawing Sheets

METHOD AND APPARATUS FOR BACKING UP AND RESTORING DOMAIN INFORMATION

CROSS-REFERENCE TO RELATED PATENT APPLICATIONS

This application claims the benefit of U.S. Provisional Patent Application No. 60/661,037, filed on Mar. 14, 2005, with the U.S. Patent and Trademark Office, the entire disclosure of which is incorporated herein by reference. This application also claims the benefit of priority of Korean Patent Application No. 10-2005-0043759, filed on May 24, 2005, in the Korean Intellectual Property Office, the disclosures of which is incorporated herein in its entirety by reference.

BACKGROUND OF THE INVENTION

1. Field of the Invention

The present invention broadly relates to protecting digital content.

2. Description of the Related Art

Recently, transmission of digital content via various types of communication media, such as the Internet, terrestrial broadcasting, cables, and satellites has rapidly increased. Also, selling and/or rental of digital content stored on large capacity storage media, such as compact disks (CDs) and digital versatile disks (DVDs), have rapidly increased. Thus, digital rights management (DRM), that is, a solution for the copyright protection of the digital content, has become an important issue. In particular, there are many research projects on the DRM to allow an authorized user in a home domain to receive various content services from devices belonging to a home domain.

FIG. 1 is a diagram illustrating a conventional home domain 1 that includes a domain server 10 and first through fifth devices 11 through 15.

The domain server 10 manages the home domain 1 such that only an authorized user of the home domain 1 can receive various content services from the first through fifth devices 11 through 15 in the home domain 1.

However, when the domain server 10 malfunctions, it cannot manage the home domain 1, thereby preventing the content services from being normally provided in the home domain 1. Accordingly, the home domain 1 must be reconstructed.

SUMMARY OF THE INVENTION

An aspect of the present invention is to provide an apparatus and a method capable of ensuring smooth management of a home domain even when a domain server malfunctions, thereby ensuring that the content services are normally provided in the home domain.

Illustrative, non-limiting embodiments of the present invention may overcome the above disadvantages and other disadvantages not described above. The present invention is not necessarily required to overcome any of the disadvantages described above, and the illustrative, non-limiting embodiments of the present invention may not overcome any of the problems described above. The appended claims should be consulted to ascertain the true scope of the invention.

The present invention may provide a computer readable recording medium having embodied thereon a program for executing the method described-above in a computer.

According to an aspect of the present invention, there is provided a method of backing up domain information regarding construction of a domain. The method includes encrypting the domain information and storing the encrypted domain information in a predetermined storage device in the domain.

According to yet another aspect of the present invention, there is provided an apparatus for backing up domain information regarding construction of a domain. The apparatus includes an encryption unit encrypting the domain information and a storage unit storing the encrypted domain information in a predetermined storage device in the domain.

According to another aspect of the present invention, there is provided a computer readable recording medium having embodied thereon a program for executing a method of backing up domain information regarding the construction of a domain in a computer.

According to yet another aspect of the present invention, there is provided a method of restoring domain information regarding construction of a domain. The method includes obtaining encrypted domain information from a predetermined storage device in the domain and decrypting the encrypted domain information.

According to yet another aspect of the present invention, there is provided an apparatus for restoring domain information regarding construction of a domain. The apparatus includes an obtaining unit obtaining encrypted domain information regarding the domain from a predetermined storage device in the domain and a decryption unit decrypting the encrypted domain information.

According to still another aspect of the present invention, there is provided a computer readable recording medium having embodied thereon a program for executing a method of restoring of domain information regarding the construction of a domain in a computer.

BRIEF DESCRIPTION OF THE DRAWINGS

The above and other aspects of the present invention will become more apparent by describing in detail Exemplary embodiments thereof with reference to the accompanying drawings. In the drawings, the same reference characters denote analogous elements, in which.

DETAILED DESCRIPTION OF THE EXEMPLARY EMBODIMENTS OF THE PRESENT INVENTION

Hereinafter, exemplary, non-limiting embodiments of the present invention will be described in detail with reference the accompanying drawings.

Figure 1:
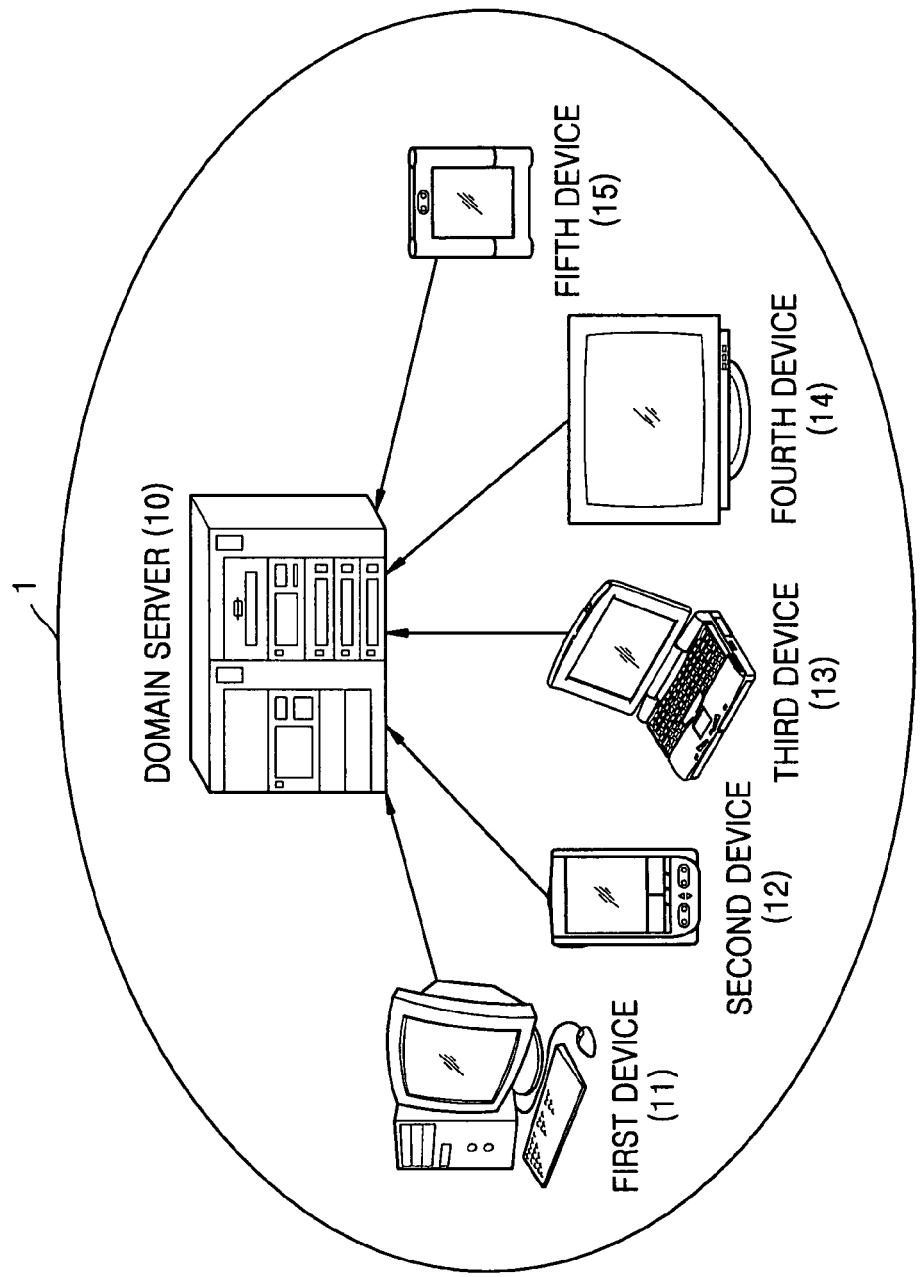
FIG. 1 is a diagram illustrating a conventional home domain.
Figure 2:
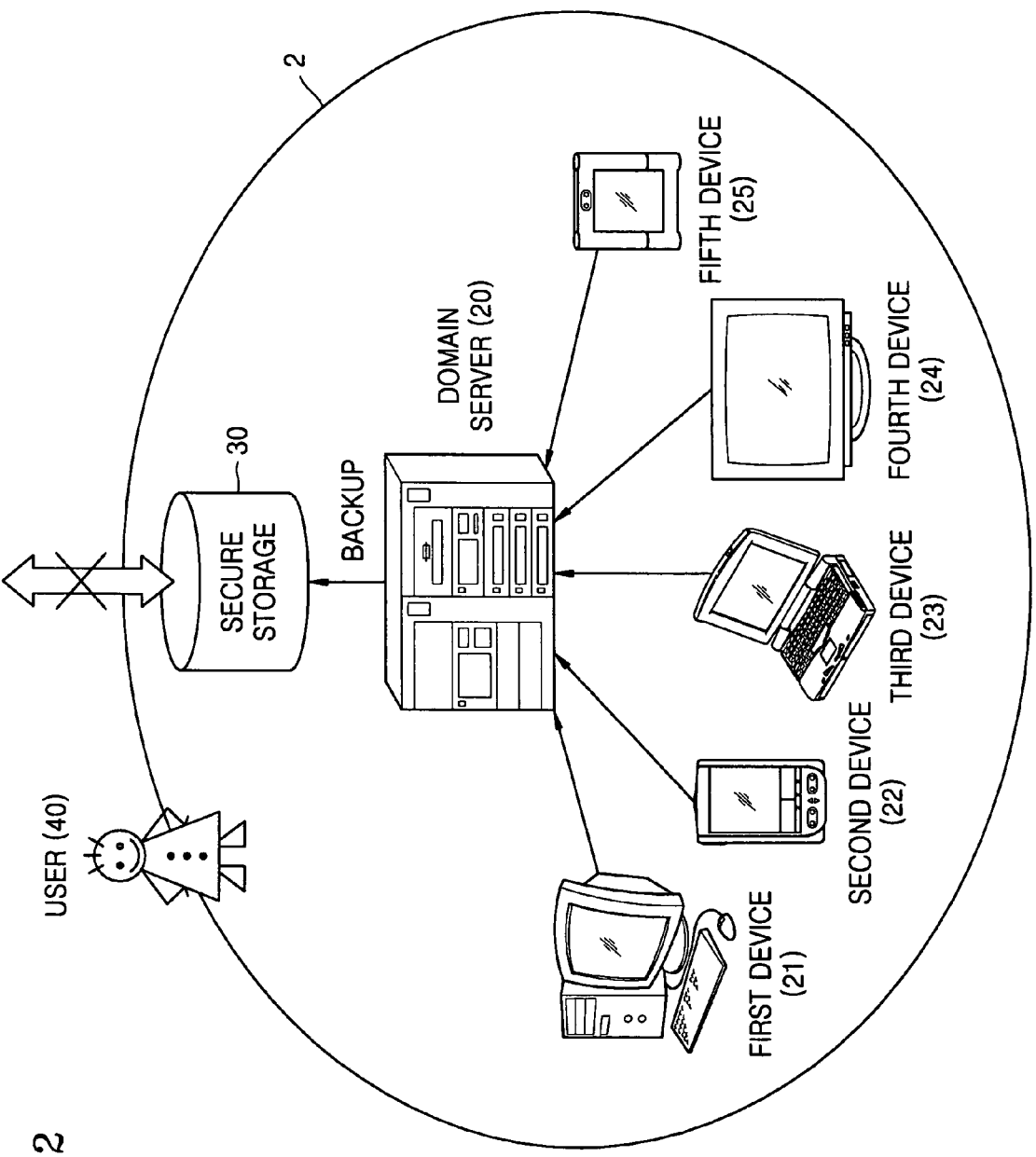
FIG. 2 is a diagram illustrating a domain information backup environment of a home domain according to an exemplary, non-limiting embodiment of the present invention.

FIG. 2 is a diagram illustrating a domain information backup environment of a home domain 2 according to an exemplary embodiment of the present invention. Referring to FIG. 2, the home domain 2 includes a domain server 20, first through fifth devices 21 through 25, and a secure storage device 30.

The domain server 20 manages the home domain 2 based on domain information regarding the construction of the home domain 2. That is, the domain server 20 allows only an authorized user of the home domain 2 to receive various content services from the first through fifth devices 21 through 25 over the home domain 2, based on the domain information.

In particular, the domain information specifies the first through fifth devices 21 through 25 connected to the home domain 2, and the authorized user of the home domain 2, for example, so that the domain server 20 can manage the domain server 20. Specifically, the domain information may, for example, be embodied as a domain information table 300 illustrated in FIG. 3.

Figure 3:
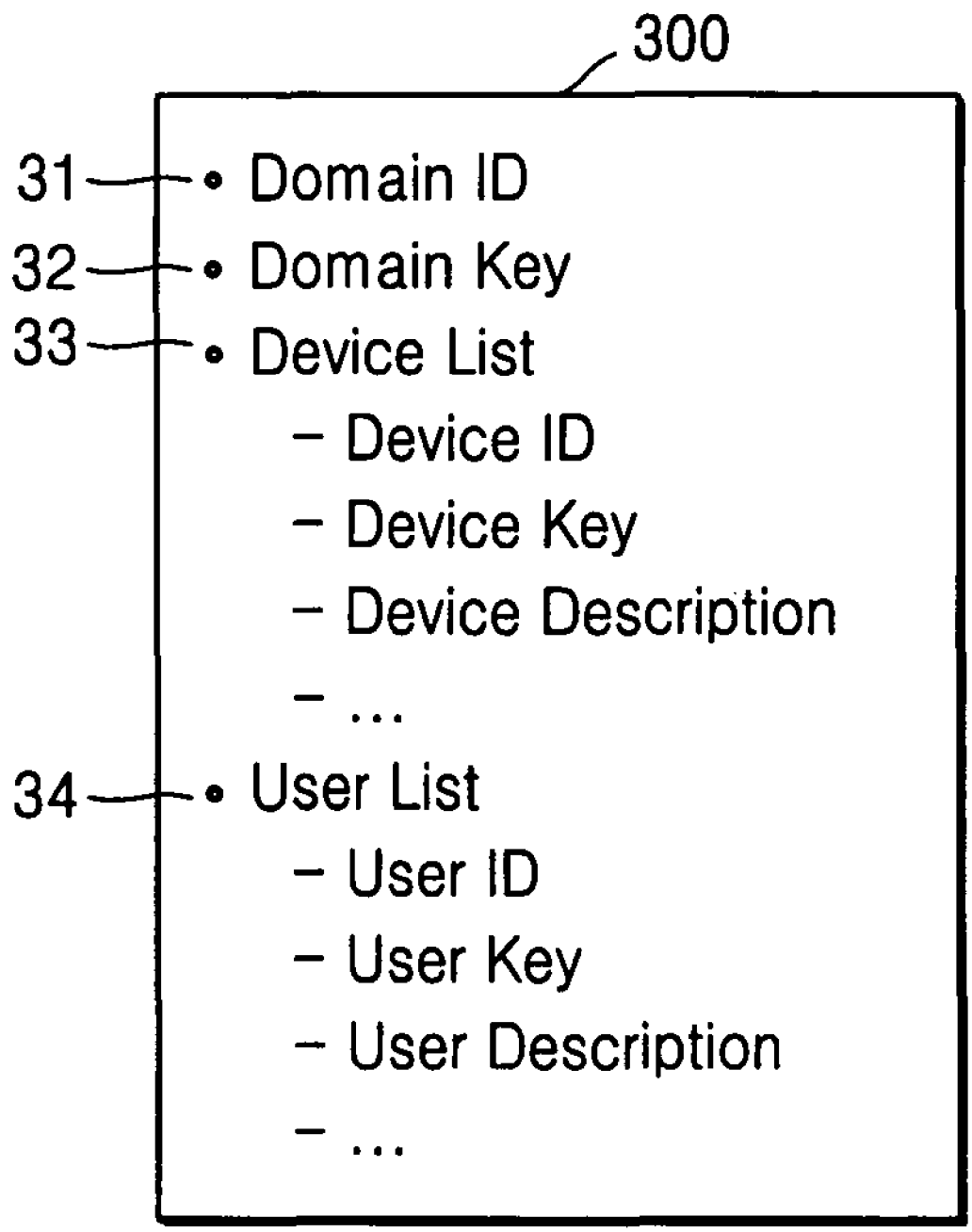
FIG. 3 illustrates a domain information table according to an exemplary embodiment of the present invention.

FIG. 3 illustrates the construction of a domain information table 300 according to an exemplary embodiment of the present invention. Referring to FIG. 3, the domain information table 300 includes domain identification (ID) 31, a domain key 32, a device list 33, and a user list 34.

The domain ID 31 is a value for identifying the home domain 2 of FIG. 2. The domain key 32 is an encryption key assigned to the home domain 2. To securely provide content to the first through fifth devices 21 through 25, the domain server 20 encrypts the content using the domain key 32 and provides the encrypted content to the first through fifth devices 21 through 25.

The device list 33 includes information regarding at least one device such as devices one through five, and the information includes a device ID, a device key, and a device description regarding the at least one device. The device ID is a value for identifying the device. The device key is a decryption key used to decrypt the content provided from the domain server 20. The device description specifies general characteristics of the device.

The user list 34 includes information regarding at least one user, and the information includes a user ID, a user key, and a user description regarding the at least one user. The user ID is a value for identifying the user. In general, the user key is a user password, but various other user authentication elements may be used such as a smart card, a certificate of authentication, and bio-recognition items. In particular, the user key must be managed to ensure security thereof compared to the other user information.

However, when the domain server 20 malfunctions, the domain server 20 cannot manage the home domain 2, thereby preventing content services from being normally provided within the home domain 2. In this case, according to an exemplary embodiment of the present invention, the domain information is encrypted using information regarding a user 40 over the home domain 2 and a backup of the encrypted domain information is stored in the secure storage device 30 so as to prevent the domain information from being disclosed even when the domain server 20 malfunctions and to allow only an authorized user of the home domain 2 to restore the domain information.

In particular, the secure storage device 30 according to the exemplary embodiment is not connected to any network outside the home domain 2 so that the secure storage device 30 can be protected from external attacks such as hacking.

Figure 4:
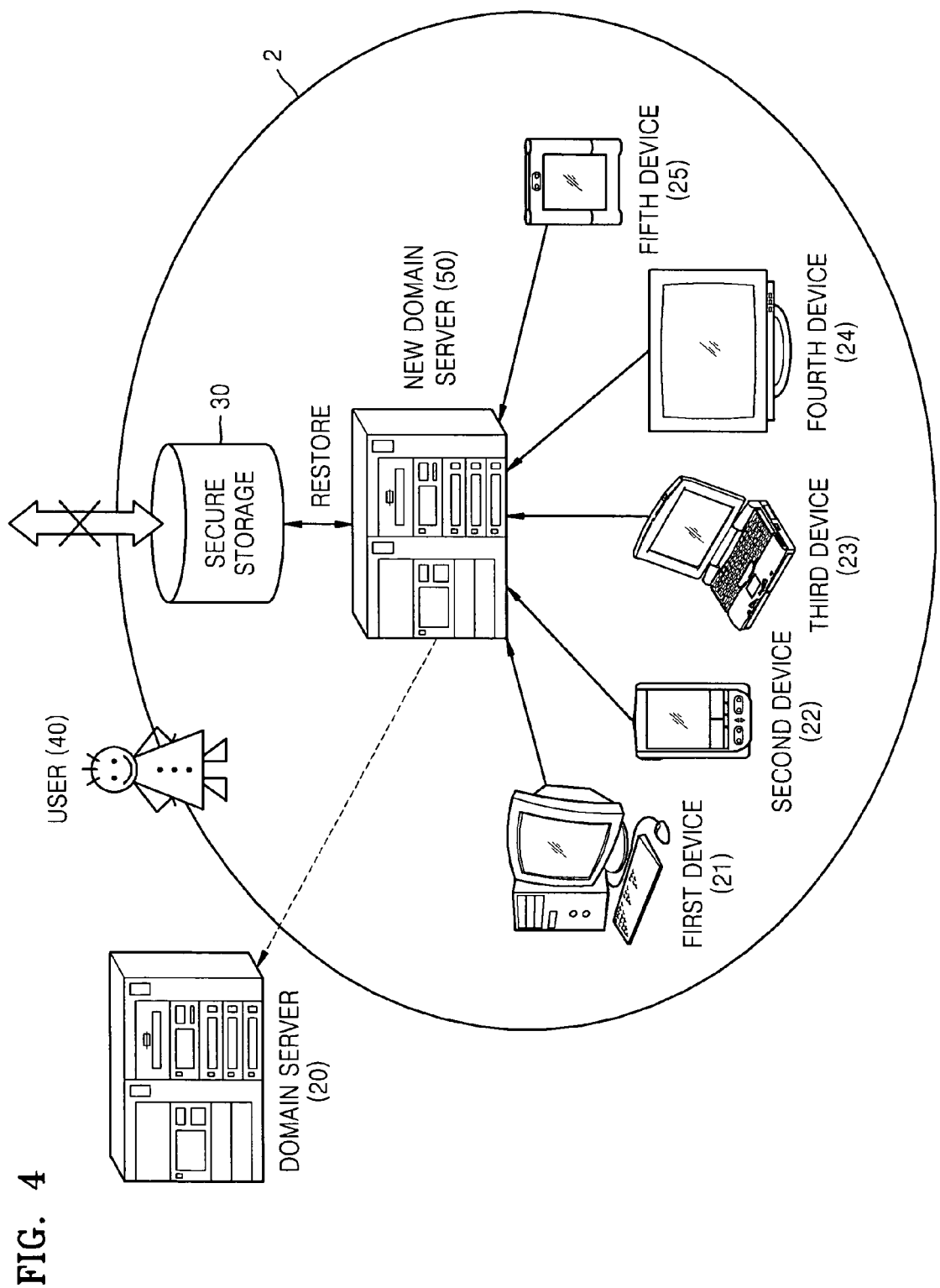
FIG. 4 is a diagram illustrating a domain information restoring environment of a home domain according to an exemplary embodiment of the present invention.

FIG. 4 is a diagram illustrating a domain information restoring environment of a home domain 2 according to an exemplary embodiment of the present invention. Referring to FIG. 4, the home domain 2 includes a new domain server 50, first through fifth devices 21 through 25, and a secure storage device 30. Since the existing domain server 20 malfunctions, it is replaced with a new domain server 50. However, it would be apparent to those of ordinary skill in the art that the domain server 50 may be another device such as one of the first through fifth devices 21 through 25, or the existing domain server 20.

When the existing domain server 20 malfunctions, the new domain server 50 acquires domain information by obtaining encrypted domain information regarding the home domain 2 from the secure storage device 30 and decrypts the obtained encrypted domain information using information regarding a user 40 over the home domain 2.

Figure 5:
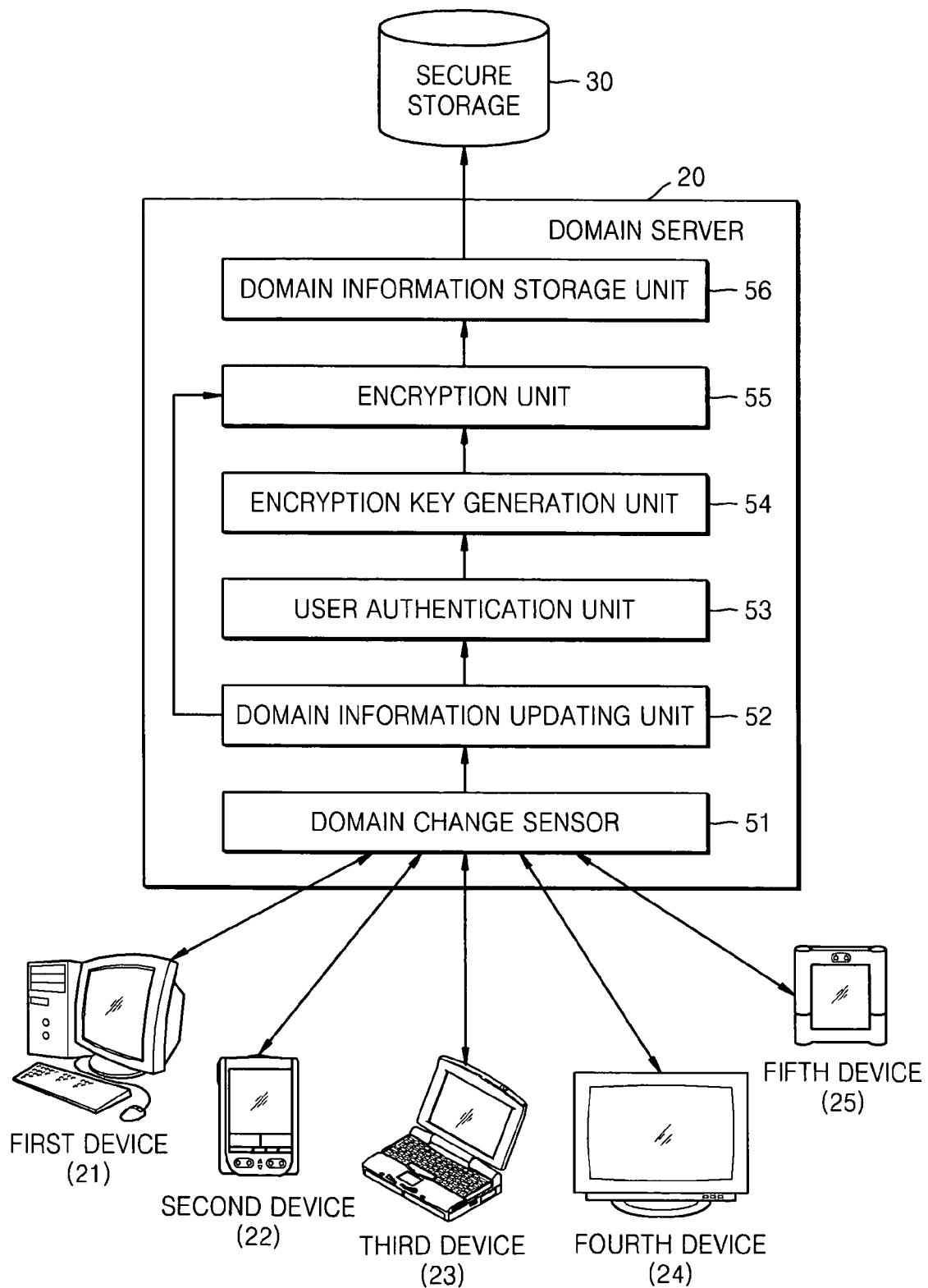
FIG. 5 is a block diagram of a domain information backup apparatus according to an exemplary embodiment of the present invention.

FIG. 5 is a block diagram of an apparatus for backing up domain information according to an exemplary embodiment of the present invention. Referring to FIG. 5, the apparatus is installed in the domain server 20 of FIG. 2, and includes a domain change sensor 51, a domain information updating unit 52, a user authentication unit 53, an encryption key generation unit 54, an encryption unit 55, and a domain information storage unit 56.

The domain change sensor 51 senses a change in domain information regarding a home domain 2. For instance, when one of first through fifth devices 21 through 25 belonging to the home domain 2 leaves the home domain 2 or a new device joins the home domain 2, the domain change sensor 51 senses such a change in the domain information. Also, when a user 40 is deprived of a right of use of the home domain 2 or a person obtains the right, the domain change sensor 51 senses such a change in the domain information.

The domain information updating unit 52 updates the domain information regarding the home domain 2 based on the change in the domain information sensed by the domain change sensor 51. For instance, the domain information updating unit 52 deletes, from the domain information table 300, the device ID, the device key, and the device description of the device leaving the home domain 2, which is sensed by the domain change sensor 51. Also, the domain information updating unit 52 adds to the domain information table 300 the device ID, the device key, and the device description of the device newly joining the home domain 2, which is sensed by the domain change sensor 51.

Moreover, the domain information updating unit 52 deletes from the domain information table 300 the user ID, the user key, and the user description of the user who is deprived of a right of use of the home domain 2, which is sensed by the domain change sensor 51. Also, the domain information updating unit 52 adds to the domain information table 300 the user ID, the user key, and the user description of the user who obtains a right of use of the home domain 2, which is sensed by the domain change sensor 51.

After the domain information updating unit 52 completes updating of the domain information, the user authentication unit 53 authenticates the user 40 over the home domain 2. When a user key is used as a user password, the user authentication unit 53 receives the user ID and the user password from the user 40 and determines whether the received user ID is identical to the user ID that the domain server 20 retains. If the two match, the user authentication unit 53 determines whether a user password value that the domain server 20 retains is identical to the received user password, in a manner secure from external attacks. If the value that the domain server 20 retains is identical to the received user password, the user authentication unit 53 authenticates that the user 40 over the home domain 2 has a right of use of the home domain 2.

The domain server 20 holds user information that includes the user ID and the user password, through user enrollment. When different user information is used as a user key, the domain server 50 may further have user information other than the user ID and the user password.

When the user authentication unit 53 authenticates that the user 40 over the home domain 2 is a legitimate user of the home domain 2, the encryption key generation unit 54 generates an encryption key Ke from information regarding the user 40. For instance, the encryption key generation unit 54 generates the encryption key Ke using the user password from among the information regarding the user 40 authenticated by the user authentication unit 53. In general, the user password is stored in a hashed form and known to only the user 40 over the home domain 2. Thus, the user password is preferably used to make the encryption key Ke.

In particular, the encryption key generation unit 54 generates the encryption key Ke according to a predetermined encryption algorithm. For instance, if the predetermined encryption algorithm uses a secret key cryptographic system, the encryption key generation unit 54 generates a secret key Ke using the user password. If the predetermined encryption algorithm uses a public key cryptographic system, the encryption key generation unit 54 generates a public key Ke using the user password.

In the former case, the secret key Ke must be generated to be identical to a secret key Kd, which is to be used as a decryption key in the new domain server 50, according to the secret key cryptographic system. In the latter case, the public key Ke generated by the encryption key generation unit 54 according to the public key cryptographic system must be provided to the new domain server 20.

The encryption unit 55 generates encrypted domain information E(Ke, Domain_Info) by encrypting the domain information updated by the domain information updating unit 52, using the encryption key Ke generated by the encryption key generation unit 54. For instance, the encryption unit 55 generates encrypted domain information E(Ke, Domain_Info) by encrypting the domain information table 300 in which a device is added to or deleted from by the domain information updating unit 52. Also, the encryption unit 55 generates encrypted domain information E(Ke, Domain_Info) by encrypting the domain information table 32 to which a user is added to or deleted from by the domain information updating unit 52.

The domain information storage unit 56 stores the encrypted domain information E(Ke, Domain_Info) encrypted by the encryption unit 55 in the secure storage unit 30. As described above, the secure storage unit 30 is not connected to any network outside the home domain 2 and thus is not affected by external attacks to the home domain 2. The domain information storage unit 56 may periodically store the domain information in consideration of the storage reliability of a memory of the secure storage device 30.

Figure 6:
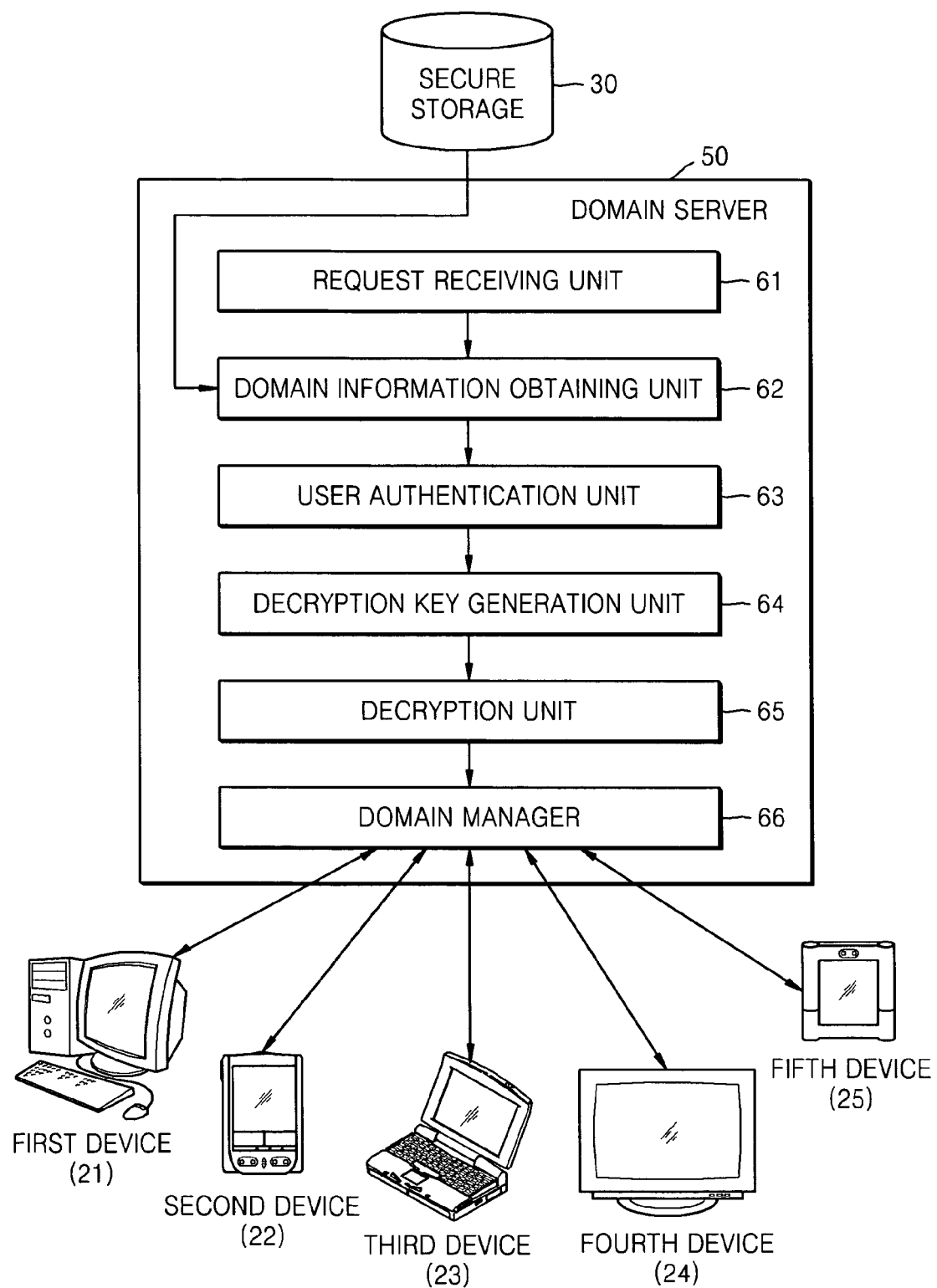
FIG. 6 is a block diagram of a domain information restoring apparatus according to an exemplary embodiment of the present invention.

FIG. 6 is a block diagram of an apparatus for restoring domain information according to an exemplary embodiment of the present invention. Referring to FIG. 6, the apparatus is installed in the new domain server 50, for example, the one depicted in FIG. 4, and includes a request receiving unit 61, a domain information obtaining unit 62, a user authentication unit 63, a decryption key generation unit 64, a decryption unit 65, and a domain manager 66.

The request receiving unit 61 receives a request for restoring the domain information when the domain server 20 backing up the encrypted domain information E(Ke, Domain-_Info) and storing the backup in the secure storage device 30 malfunctions. More specifically, when the domain server 20 malfunctions and thus cannot normally manage the home domain 2, the request receiving unit 61 receives a request for restoring the domain information from the user 40 who recognizes the malfunction of the domain server 20. Alternatively, the request receiving unit 61 may receive a request for restoring the domain information from the domain server 20 at substantially the same time as the malfunction of the domain server 20.

In general, when the new domain server 50 replaces the domain server 20 that malfunctions in the home domain 2, the request receiving unit 61 receives the request for restoring the domain information from the user 40 since communications cannot be made between the domain server 20 and the new domain server 50. When one of the first through fifth devices 21 through 25 over the home domain 2 acts as the new domain server 50, the request receiving unit 61 receives the request for restoring the domain information from the domain server 20 since communications can be made between the domain server 20 and the new domain server 50.

When the request receiving unit 61 receives the request, the domain information obtaining unit 62 obtains encrypted domain information E(Ke, Domain_Info) regarding the home domain 2 from the secure storage device 30. That is, the domain information obtaining unit 62 reads an encrypted domain information table from the secure storage device 30 when the request receiving unit 61 receives the request.

When the domain information obtaining unit 62 completes obtaining of the domain information, the user authentication unit 63 authenticates the user 40 of the home domain 2. If a user key is used as a user password, the user authentication unit 63 receives the user ID and user password of the user 40 from the user 40, and determines whether the received user ID is identical to user ID that the domain server 50 retains. If so, the user authentication unit 63 determines whether a value that the domain server 50 retains is identical to the user password in a secure manner. If the value that the domain server 50 holds is identical to the user password, the user authentication unit 63 authenticates that the user 40 of the home domain 2 has a legitimate right of use of the home domain 2.

The domain server 50 holds user information that includes the user ID and the user password, through user enrollment. However, when different user information is used as a user key, the domain server 50 may further have user information other than the user ID and the user password.

When the user authentication unit 63 authenticates that the user 40 of the home domain 2 is a legitimate user of the home domain 2, the decryption key generation unit 64 generates a decryption key Kd from information regarding the user 40. For instance, the decryption key generation unit 64 generates decryption key Kd using the user password from among the information of the user 40 authenticated by the user authentication unit 63. In general, the user password is stored in a hashed form and known to only the user 40 of the home domain 2. Thus, the user password is preferably used to generate the decryption key Kd.

In particular, the decryption key generation unit 64 generates the decryption key Kd according to a predetermined encryption algorithm. For instance, when the predetermined encryption algorithm uses the secret key cryptographic system, the decryption key generation unit 64 generates a secret key Kd using the user password. When the predetermined encryption algorithm uses the public key cryptographic system, the decryption key generation unit 64 generates a private key Kd using the user password.

However, in the former case, the secret key Kd must be generated to be identical to a secret key Ke, which is to be used in the domain server 20, according to the secret key cryptographic system. In the latter case, the private key Kd must be generated to be coupled to a public key Ke provided from the domain server 20, according to the public key cryptographic system.

The decryption unit 65 obtains the domain information by decrypting the encrypted domain information E(Ke, Domain_Info) obtained by the domain information obtaining unit 62, using the decryption key Kd generated by the decryption key generation unit 64.

The domain manager 66 manages the home domain 2 based on the domain information decrypted by the decryption unit 65. For instance, the domain manager 66 provides content to devices listed in a device list of the domain information table 300 decrypted by the decryption unit 65 so that the content can be shared among devices connected to the home domain 2.

Figure 7:
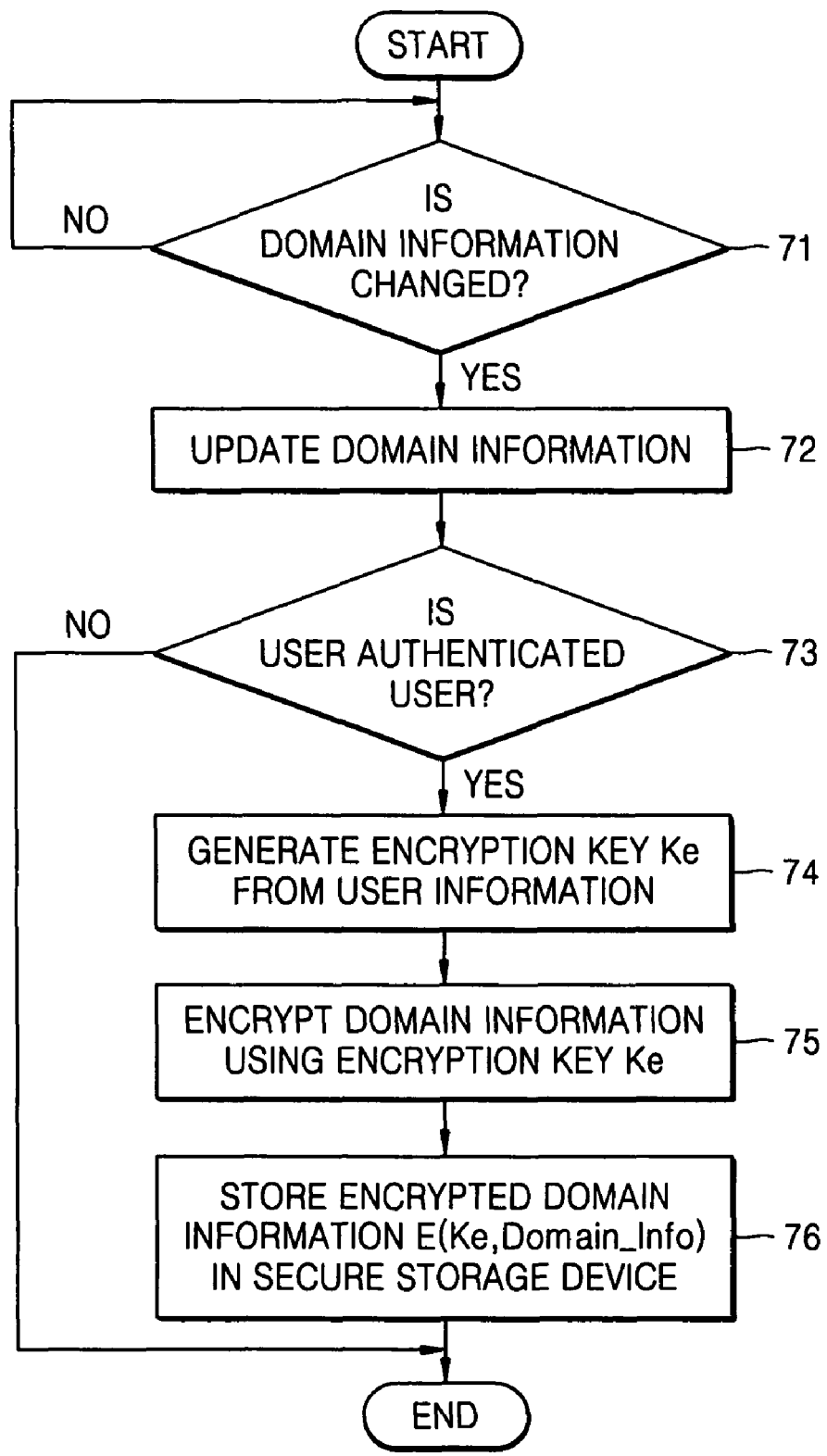
FIG. 7 is a flowchart of a method of backing up domain information according to an exemplary embodiment of the present invention.

FIG. 7 is a flowchart illustrating a method of backing up domain information according to an exemplary embodiment of the present invention. The method of FIG. 7 includes operations that may be performed by the apparatus illustrated in FIG. 5. Accordingly, even if not described here, the operations described with reference to FIG. 5 also apply to the method of FIG. 7.

Referring to FIG. 7, in operation 71, the domain server 20 senses whether there is a change in domain information regarding the home domain 2.

In operation 72, when a change in the domain information is sensed in operation 71, the domain server 20 updates the domain information regarding the home domain 2 based on the change in the domain information.

In operation 73, when completing updating of the domain information in operation 72, the domain server 20 authenticates the user 40 of the home domain 2.

In operation 74, when the user 40 of the home domain 2 is authenticated as a legitimate user of the home domain 2, the domain server 20 generates an encryption key Ke from information regarding the user 40.

In operation 75, the domain server 20 generates domain information E(Ke, Domain_Info) by encrypting the domain information updated in operation 72, using the encryption key Ke generated in operation 74.

In operation 76, the domain server 20 stores the encrypted domain information E(Ke, Domain_Info) encrypted by the encryption unit 55 in the secure storage device 30.

Figure 8:
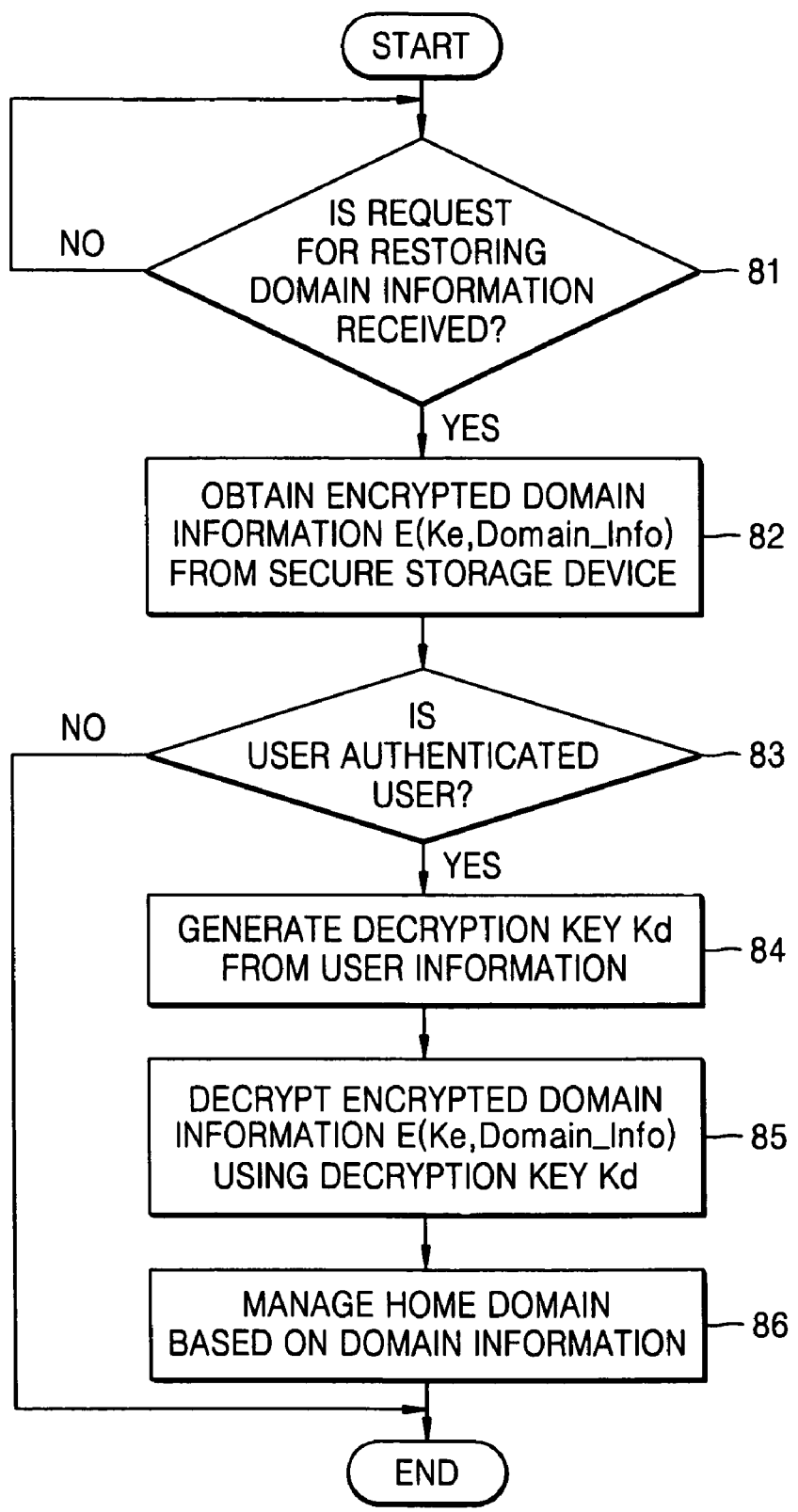
FIG. 8 is a flowchart of a method of restoring domain information according to an exemplary embodiment of the present invention.

FIG. 8 is a flowchart illustrating a method of restoring domain information according to an exemplary embodiment of the present invention. The method of FIG. 8 includes operations that may be performed by the apparatus illustrated in FIG. 6. Accordingly, even if not described here, the operations described with reference to FIG. 6 also apply to the method of FIG. 8.

Referring to FIG. 8, in operation 81, the domain server 50 receives a request for restoring domain information when the domain server 20 backing up encrypted domain information E(Ke, Domain_Info) and storing the backup in the secure storage device 30 malfunctions.

In operation 82, upon receiving the request for restoring the domain information in operation 81, the domain server 50 obtains the encrypted domain information E(Ke, Domain_Info) regarding the home domain 2 from the secure storage device 30.

In operation 83, after obtaining the encrypted domain information E(Ke, Domain_Info) in operation 82, the domain server 50 authenticates the user 40 of the home domain 2.

In operation 84, when the user 40 of the home domain 2 is authenticated as a legitimate user of the home domain 2 in operation 83, the domain server 50 generates a decryption key Kd from information regarding the user 40.

In operation 85, the domain server 50 obtains the domain information by decrypting the encrypted domain information E(Ke, Domain_Info) obtained in operation 82, using the decryption key Kd generated in operation 84.

In operation 86, the domain server 50 manages the home domain 2 based on the domain information decrypted in operation 85.

The present invention may be embodied as a program that can be executed in a computer, and performed in a general digital computer that runs the program using a computer readable medium. Also, data used in the above exemplary embodiments of the present invention may be recorded on a computer readable medium through various media.

The computer readable medium may be any recording apparatus capable of storing data that is read by a computer system, e.g., a magnetic recording medium (a read-only memory (ROM), a floppy disk, a hard disk, etc.), and an optical recording medium (a compact disc (CD)-ROM, a digital versatile disc (DVD), etc.), for example.

According to an exemplary embodiment of the present invention, it is possible to securely back up domain information without the help of an external network by encrypting the domain information and storing the encrypted domain information in a secure storage device over a home domain. Thus, even when the existing domain server malfunctions, a new domain server is capable of obtaining the domain information by decrypting the encrypted domain information obtained from the secure storage device, thereby enabling smooth management of the home domain. As a result, the content service can be normally provided within the home domain regardless of whether the domain server malfunctions.

That is, according to an exemplary embodiment of the present invention, even if the existing domain server malfunctions, another device is capable of obtaining the domain information and managing the home domain without interruption. Therefore, since there is no need to reconstruct the home domain, it is possible to provide transparent content services to devices belonging to the home domain without regard to whether the domain server malfunctions or not.

In particular, according to an exemplary embodiment of the present invention, domain information is encrypted using user information and the encrypted domain information is decrypted by the user information, thereby allowing only an authorized user of the home domain to acquire the domain information. Accordingly, it is possible to prevent an unauthorized user from using content services without permission even when the domain server malfunctions.

While this invention has been particularly shown and described with reference to exemplary embodiments thereof, it will be understood by those skilled in the art that various changes in form and details may be made therein without departing from the spirit and scope of the invention as defined by the appended claims. Therefore, the scope of the invention is given by the appended claims, rather than the preceding description, and all variations and equivalents which fall within the range of the claims are intended to be embraced therein.

What is claimed is:

1. A method of backing up domain information relating to construction of a domain, comprising:
   (a) at a first domain server, which manages the domain including the first domain server and at least one device that is separate from the first domain server and provided with content services by the domain managing of the first domain server based on the domain information, encrypting the domain information including information specifying the at least one device connected to the domain; and
   (b) at the first domain server, storing the encrypted domain information in a predetermined storage device in the domain, which is connected to the first domain server in the domain,
   wherein when the first domain server malfunctions, the encrypted domain information is obtained from the predetermined storage device by a second domain server, and
   wherein the predetermined storage device is connected only to domain servers in the domain.

2. The method of claim 1, wherein during said encrypting of the domain information, the domain information is encrypted using information which defines a user of the domain.

3. The method of claim 2, further comprising:
   authenticating the user; and
   generating an encryption key using the information regarding the user when the user is authenticated as a legitimate user of the domain,
   wherein during said encrypting of the domain information, the domain information is encrypted using the encryption key.

4. The method of claim 1, further comprising:
   sensing a change in the domain information; and
   updating the domain information based on the sensed change,
   wherein during said encrypting of the domain information, the updated domain information is encrypted.

5. The method of claim 1, wherein the predetermined storage device is connected to a domain server which communicates with devices and wherein the domain server stores same information as the predetermined storage device.

6. The method of claim 5, wherein the predetermined storage device is dedicated to storing encrypted domain information and is configured to communicate only with the domain server.

7. The method of claim 1, wherein the domain information further includes information specifying at least one authorized user of the domain.

8. The method of claim 7, wherein the domain information is encrypted using the user key and wherein the domain is a home domain.

9. The method of claim 1, wherein the predetermined storage device is dedicated to communicate only with the first and second domain servers and wherein the first and second domain servers communicate with the at least one device in the domain and communicate outside of the domain.

10. The method of claim 1, wherein:
    the predetermined storage device has a different structure from the first and second domain servers,
    the first domain server is connected to the at least one device of the home network and when the first domain server malfunctions, the second domain server is connected to the at least one device of the home network, and
    whichever one of the first domain server and the second domain server that is connected, detects domain changes and updates the predetermined storage device.

11. The method of claim 1, wherein the predetermined storage device is dedicated to storing the domain information.

12. The method of claim 1, wherein during said encrypting of the domain information, the domain information is encrypted using information which identifies and describes a user of the domain.

13. The method of claim 1, wherein:
    the predetermined storage device is part of a home network, is in the domain, and cannot communicate with the at least one device in the domain, and
    the domain servers comprise a first domain server and a second domain server which replaces the first domain server.

14. An apparatus for backing up domain information relating to construction of a domain, at a first domain server, which manages the domain based on the domain information, the apparatus comprising:
    an encryption unit encrypting the domain information including information specifying at least one device connected to the domain; and
    a storage unit storing in the domain, the encrypted domain information,
    wherein when the first domain server malfunctions, the encrypted domain information is obtained from the storage unit by a second domain server,
    wherein the domain includes the first domain server and the at least one device that is separate from the first domain server and provided with content services by the domain managing of the first domain server based on the domain information,
    wherein the predetermined storage device is connected only to domain servers in the domain.

15. The apparatus of claim 14, wherein the encryption unit encrypts the domain information using information relating to a user of the domain.

16. The apparatus of claim 15, further comprising:
    an authentication unit authenticating the user; and
    an encryption key generation unit generating an encryption key from the information relating to the user when the user is authenticated as a legitimate user of the domain,
    wherein the encryption unit encrypts the domain information using the encryption key.

17. A non-transitory computer readable recording medium having embodied thereon a program for executing a method of backing up domain information relating to construction of a domain in a computer, the method comprising:
    at a first domain server, which manages the domain including the first domain server and at least one device that is separate from the first domain server and provided with content services by the domain managing of the first domain server based on the domain information, encrypting the domain information; and
    at the first domain server, storing in the domain, the encrypted domain information in a predetermined storage device, which is connected to the first domain server in the domain,
    wherein when the first domain server malfunctions, the encrypted domain information is obtained from the predetermined storage device by a second domain server,
    wherein the predetermined storage device is connected only to domain servers in the domain.

18. A method of restoring domain information relating to a construction of a domain, comprising:
  (a) at a second domain server, obtaining in the domain, encrypted domain information from a predetermined storage device connected to a first domain server, which manages the domain including the first domain server and at least one device that is separate from the first domain server and provided with content services by the domain managing of the first domain server based on the domain information, in the domain, when the first domain server malfunctions; and
  (b) at the second domain server, decrypting the encrypted domain information including information specifying the at least one device connected to the domain,
  wherein the encrypted domain information is stored in the predetermined storage device by the first domain server, and
  wherein the predetermined storage device is connected only to domain servers in the domain.

19. The method of claim 18, wherein during said decrypting, the encrypted domain information is decrypted using information relating to a user of the domain.

20. The method of claim 19, further comprising:
  authenticating the user; and
  generating a decryption key from the information relating to the user when the user is authenticated as a legitimate user of the domain,
  wherein during said decrypting, the encrypted domain information is decrypted using the decryption key.

21. The method of claim 18, further comprising:
  receiving a request for restoring the domain information when a domain server backing up the encrypted domain information and storing the backup information in the predetermined storage unit malfunctions,
  wherein during the obtaining of the encrypted domain information, the encrypted domain information is obtained in response to the request.

22. An apparatus for restoring domain information relating to construction of a domain, backed up by a first domain server, which manages the domain based on the domain information, comprising:
  an obtaining unit obtaining encrypted domain information relating to the domain from a predetermined storage device in the domain, connected to the first domain server in the domain, when the first domain server malfunctions; and
  a decryption unit decrypting the encrypted domain information including information specifying at last one device connected to the domain,
  wherein the encrypted domain information is stored in the predetermined storage device by the first domain server, and
  wherein the domain includes the first domain server and the at least one device that is separate from the first domain server and provided with content services by the domain managing of the first domain server based on the domain information, and
  wherein the predetermined storage device is connected only to domain servers in the domain.

23. The apparatus of claim 22, wherein the decryption unit decrypts the encrypted domain information using information relating to a user of the domain.

24. The apparatus of claim 23, further comprising:
  an authentication unit authenticating the user; and
  a decryption key generation unit generating a decryption key using the information relating to the user when the user is authenticated as a legitimate user of the domain,
  wherein the decryption unit decrypts the encrypted domain information using the decryption key.

25. A non-transitory computer readable recording medium having embodied thereon a program for executing a method of restoring domain information relating to construction of a domain in a computer, the method comprising:
  at a first domain server, obtaining, in the domain, encrypted domain information relating to the domain from a predetermined storage device connected to a first domain server, which manages the domain including the first domain server and at least one device that is separate from the first domain server and provided with content services by the domain managing of the first domain server based on the domain information, in the domain, when the first domain server malfunctions; and
  at a second domain server, decrypting the encrypted domain information including information specifying the at least one device connected to the domain,
  wherein the encrypted domain information is stored in the predetermined storage device by the first domain server, and
  wherein the predetermined storage device is connected only to domain servers in the domain.

* * * * *